July 28, 1959
H. HEBBINGHAUS
2,896,760
CHANGE-SPEED GEAR TRANSMISSION WITH BLOCKING
SYNCHRONIZATION FOR MOTOR VEHICLES
Filed Dec. 5, 1957
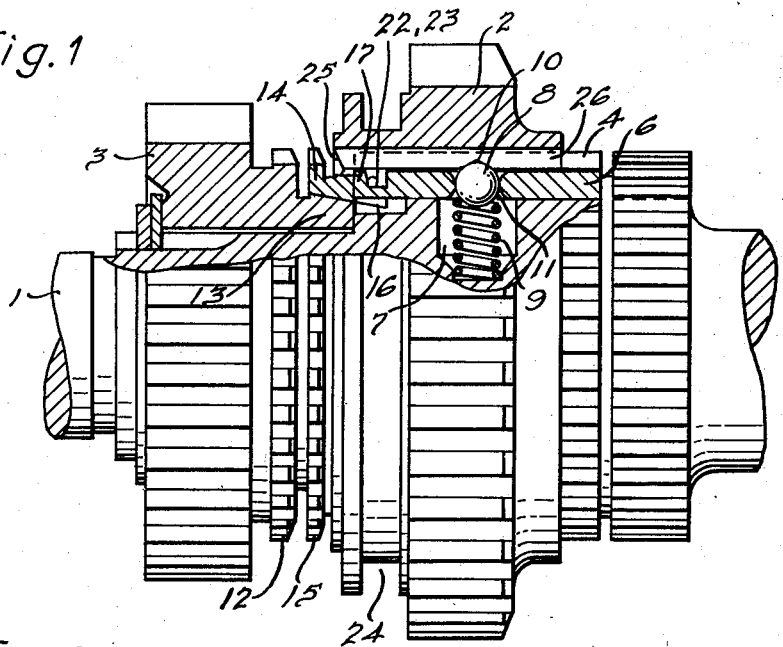
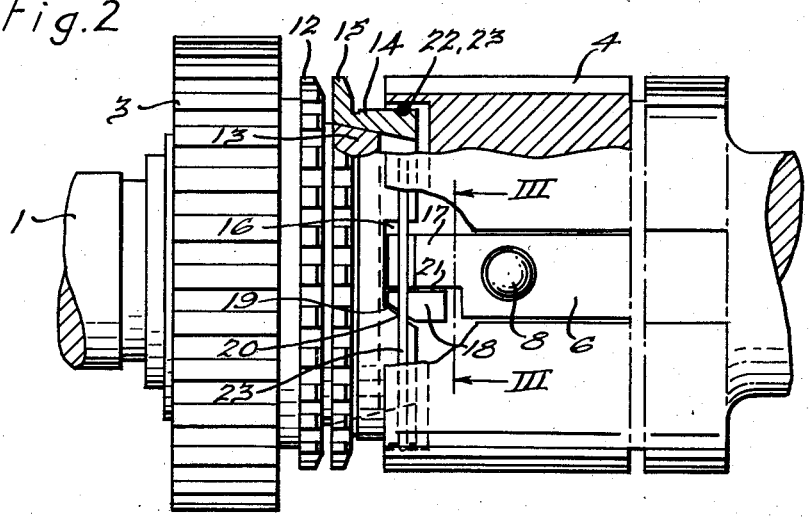
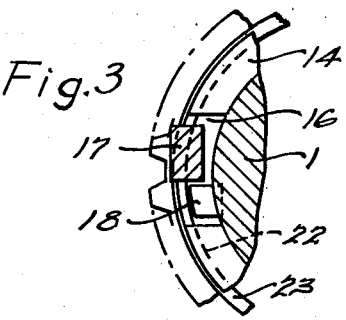
INVENTOR:
Helmut Hebbinghaus
BY
ATTORNEYS.

United States Patent Office 2,896,760
Patented July 28, 1959

2,896,760

CHANGE-SPEED GEAR TRANSMISSION WITH BLOCKING SYNCHRONIZATION FOR MOTOR VEHICLES

Helmut Hebbinghaus, Tente, Rhineland, Germany, assignor to Ford Motor Company, Dearborn, Mich., a corporation of Delaware Application December 5, 1957, Serial No. 700,871

Claims priority, application Germany December 20, 1956

2 Claims. (Cl. 192—53)

This invention relates to a motor vehicle change-speed gear transmission with blocking synchronization and its object is to acomplish the synchronization and the shifting operation with greater ease than that which is possible in transmissions now available.

With conventional synchronizing change-speed gear transmissions a synchronizer blocking ring is pressed on the cone of the sleeve gear by inserts which are movable axially by the sliding gear, the latter being guided on the main shaft by means of splines. The sliding gear may be moved in the direction of the adjacent sleeve gear which rotates loosely on the shaft and which is provided with a cone-type synchronizer clutch. Since the sliding gear and the sleeve gear have different speeds of rotation during a shifting operation, e.g. the sliding gear rotates faster than the sleeve gear, the rectangular lost motion notches formed in the synchronizer ring on its side adjacent the inserts engage the rectangular ends of the inserts which are moved into the notches. The teeth on the synchronizer ring are thereby placed in front of the clutch teeth of the sliding gear to obstruct the advance of the sliding gear. Through further effort of the driver, the sliding gear must be moved further in an axial direction and by means of the manually induced clutching action, synchronism between the sliding gear and the sleeve gear is obtained and the helical teeth of the sliding gear mesh with the helical teeth of the synchronizer ring. The synchronizer ring can now be shfted by reason of the effect of the helical gears thereby adapting the sliding gear for engagement with the clutch teeth of the sleeve gear.

In practice, especially while engaging the lower speed gear, it is still necessary for the driver to exert considerable effort to bring the sliding and sleeve gears into synchronism in the shortest possible time by means of a friction synchronizer. This is most disadvantageous in hill climbs which necessitate engaging a low gear in the shortest possible time.

It is therefore an object of the instant invention to provide a synchronizer mechanism which avoids the aforementioned disadvantage and which accomplishes the synchronization more quickly while relieving the driver of a considerable amount of shifting effort.

It is further contemplated that the invention will include cam elements situated next to the ends of the inserts which engage the notches on the side of the synchronizer ring, the cam elements being connected with a main shaft. The cam elements and the notches of the synchronizer ring are provided with adjacent side-chamfers.

When the synchronizer ring receives movement from the inserts and is pressed on the cone of the sleeve gear, it is tightly pressed against the chamfers of the cam elements due to the resulting tangential force. This tangential force gives rise to two force components, one pressing normally on the chamfer and acting on the main shaft and the other being axially directed toward the sleeve cone. This latter component supplements the force acting on the synchronizer ring thereby enlarging the synchronizer clutching effect caused by the friction on the cone clutch surface. This supplementary clutching force is obtained automatically until synchronism between the sliding gear and the sleeve gear is obtained. The effort required by the driver on the gear shift lever during the shifting operation is thus reduced by this latter force component and synchronization is accomplished with greater ease and in a shorter time interval.

It is a further object of the invention to prevent an inadvertent shift during operation in any given gear ratio and to prevent unnecessary rotation of the inactive gears. The invention therefore includes a retainer ring slidably received over the cam elements and disposed in a common annular groove formed in the inserts and in the synchronizer ring thereby connecting the inserts and the synchronizer ring. The circumferential tension of this retainer ring prevents the synchronizer ring from being pressed in the cone of the sleeve gear during normal driving.

The features of the instant invention will become apparent from the following description and from the accompanying drawings in which:

Figure 1 is a fragmentary side view of a part of the motor vehicle change-speed gear with two clutch gears;

Figure 2 is a plan view partly in section of a portion of the construction of Figure 1 with the sliding gear removed; and Figure 3 is a fragmentary cross-sectional view taken along section line III—III of Figure 2.

A sleeve portion of a torque transmitting gear 2 and another gear 3 are disposed on a main shaft 1, the gear 3 being rotatably supported in a conventional manner on the main shaft, whereas the gear 2 is guided on the main shaft by means of splines 4 on a hub carried by shaft 1. The internal splines or keys on the sliding gear also serve as the clutch teeth. A plurality of grooves 5 are equally spaced on the circumference of the transmission shaft and by preference they are three in number. Each of the grooves has received therein an insert 6 which is adapted for sliding movement therein. A ball 8 is disposed in an opening 11 formed in each insert 6 and is urged by a spring 9 against an annular groove 10 in the keys of the sliding gear, one such ball and spring being associated with each guiding groove. The balls penetrate radially outward from the openings 11 in the insert 6 so that they are acted upon by the sliding gear. The sleeve gear 3 is situated on the side facing the sliding gear and is provided with clutch teeth 12 and with a cone 13. A synchronizer blocking ring 14 is loosely seated on the cone and is formed on its circumference with blocking teeth 15. The synchronizer blocking ring 14 is also provided on the side facing the sliding gear with recesses 16 corresponding in number to the number of inserts, the ends 17 of the inserts 6 being engageable with the recesses 16. Cam elements 18 are situated adjacent the insert ends 17 and are also received in the recesses of the synchronizer ring, said elements 18 being secured to the shaft 1. A chamfered face 19 is formed on each cam element on the side facing the synchronizer ring and these chamfered faces interact with chamfered faces 20 formed in the recesses 16 of the synchronizer ring. The ends 17 of the inserts are formed with a lateral recess 21 extending from the face thereof and elements 18 are disposed therein as shown in Figure 2.

The inserts 6 and the synchronizer ring 14 are each provided with one annular transverse groove 22 in which a retainer or snap ring 23 is supported. This retainer ring connects the inserts 6 with the synchronizer ring and prevents the synchronizer ring from being unintentionally pressed on the cone of the sleeve gear. The synchronizer ring therefore cannot be actuated without movement of the sliding gear and the inserts. The elements 18 are located radially inward from the retainer ring 23. The transverse groove 22 in the inserts 6 may be nearly twice as wide as the retainer ring 23 so that the inserts have sufficient axial play during shifting and braking operation.

During operation the sliding gear may be moved towards the sleeve gear 3 by actuating a shift lever and a shifter fork received in the annular groove 24 of the sliding gear 22, said shift lever and said shifter fork not being shown in the drawings.

Motion is thus transmitted from the sliding gear to the inserts through the balls 8 which are engageable with the annular groove 10 as previously indicated, the inserts thereby pressing the synchronizer ring 14 into engagement with the cone 13 of the sleeve gear 3. Since the sliding gear 2 and the sleeve gear 3 have different rotational speeds, the chamfered faces 19 of the elements 18 engage the chamfered faces 20 of the recesses 16. The teeth 15 of the synchronizer ring thereby obstruct the axial movement of the sliding gear 2. The tangential or circumferential force established by the synchronizer ring acts on the chamfered faces 19 of the elements 18 and this tangential force is transferred into a force component acting normally on the chamfered face 19 and into an axial force component acting on the sleeve gear 3. The tangential force is thus partly resolved into an axial force which supplements the force urging the synchronizer ring into engagement with the cone of the sleeve gear 3 thereby decreasing the blocking effect until synchronism of the sliding gear and sleeve gear is obtained. When this occurs, the chamfered faces 25 of the clutch teeth 26 of the sliding gear 2 meet and are aligned with the chamfered faces on the blocking teeth 15 of the synchronizer ring 14. The chamfered faces on the clutch teeth 26 and the blocking teeth 15 permit the synchronizer ring to be rotated as the sliding gear is moved axially thus allowing the sliding gear to engage the clutch teeth 12 of the sleeve gear 3. The shifting operation is then accomplished and the transition from a high to a low speed gear is effected without dangerous stress on the clutch teeth of the sleeve gear or the sliding gear and with less effort on the part of the driver.

The invention is not limited to the assembly as illustrated and described herein, but it may be modified within the scope of the inventive concept. For example, the elements 18 and the chamfered faces 19 can be disposed on each side of the inserts 6 and the recesses 16 and the synchronizer ring 14 may have a second chamfered face 20 adapted to cooperate with the corresponding chamfered face on this additional cam element so that the above described axial force component becomes effective during engagement of a higher as well as a lower speed gear. Also, it is possible to modify the characteristics of the synchronizer ring, if it becomes desirable to alter the physical dimensions of elements 18 and the recesses 16.

What is claimed is:

1. In a change-speed gear transmission with locking synchronization for motor vehicles, a main shaft, a sleeve member, a hub carried by said main shaft, a spline connection between said hub and said sleeve member adapted to acommodate relative axial movement therebetween, axial grooves formed in said hub, inserts slidably received in said grooves, detent means for connecting said sleeve member and said inserts, a gear encircling said shaft, a synchronizer ring situated between said gear and said sleeve member, a plurality of recesses formed in said synchronizer ring, each recess being adapted to receive one end of a separate one of said inserts, a cam element positively carried by said shaft and situated between an insert and one side of an associated recess, said last-mentioned recess and said cam element being formed with mutually engageable chamfered surfaces, friction clutch means for frictionally connecting said synchronizer ring and said gear when said synchronizer ring is urged in one axial direction, said inserts being adapted to urge said synchronizer ring in an axial direction to energize said clutch means and said cam element being adapted to exert an axial force on said synchronizer ring during a speed change when said gear and said main shaft are rotating at different speeds thereby supplementing the axially directed synchronizing force of said inserts and means for providing a lost motion connection between said inserts and said synchronizer ring whereby the latter is inhibited from shifting in said one axial direction when said main shaft is disconnected from said gear.

2. In a change-speed gear transmission with locking synchronization for motor vehicles, a main shaft, a sleeve member, a hub carried by said main shaft, a spline connection between said hub and said sleeve member adapted to accommodate relative axial movement therebetween, axial grooves formed in said hub, inserts slidably received in said grooves, detent means for connecting said sliding gear and said inserts, a gear encircling said shaft, a synchronizer ring situated between said gear and said sleeve member, a plurality of recesses formed in said synchronizer ring, each recess being adapted to receive one end of a separate one of said inserts, cam elements secured to said shaft, one cam element being situated between each insert and one side of the associated recess, said recesses and said cam elements each being formed with mutually engageable chamfered surfaces, friction clutch means for establishing a friction connection between said synchronizer ring and said gear, said inserts being adapted to urge said synchronizer ring in an axial direction to energize said clutch means and said cam element being adapted to exert an axial force on said synchronizer ring during a speed change when said gear and said main shaft are rotating at different speeds thereby supplementing the axially directed synchronizing force of said inserts, the ends of said inserts being provided with a circumferential groove in the region of said notches, and a retainer ring carried by said synchronizer ring, said retainer ring encircling said synchronizer ring and the cooperating ends of said inserts, said circumferential grooves being adapted to receive said retainer ring and to prevent movement of said synchronizer ring toward said gear when said gear is disconnected from said main shaft.

References Cited in the file of this patent
UNITED STATES PATENTS

| | | |
|---|---|---|
| 2,087,070 | Reggio | July 13, 1937 |
| 2,221,896 | Haigh | Nov. 19, 1940 |
| 2,238,723 | Fishburn | Apr. 15, 1941 |
| 2,495,411 | Frost | Jan. 24, 1950 |